United States Patent [19]

Joncas

[11] 4,016,672

[45] Apr. 12, 1977

[54] GUILLOTINE TYPE ANIMAL TRAP

[76] Inventor: Armand Joncas, P.P. Dequen, St. Francois de Salle, County of Roberval, Quebec, Canada, G0W 1M0

[22] Filed: Jan. 30, 1976

[21] Appl. No.: 653,651

[30] Foreign Application Priority Data

Feb. 7, 1975 Canada .............................. 219578

[52] U.S. Cl. ........................................ 43/78; 43/92
[51] Int. Cl.² ........................................ A01M 23/30
[58] Field of Search .......................... 43/78, 77, 92

[56] References Cited

UNITED STATES PATENTS

| 1,583,679 | 5/1926 | Elkins | 43/78 |
| 2,542,942 | 2/1951 | Purlee | 43/78 |
| 2,947,107 | 8/1960 | Lehn | 43/92 |
| 3,146,545 | 9/1964 | Frost | 43/92 X |

Primary Examiner—Louis G. Mancene
Assistant Examiner—Daniel J. Leach

[57] ABSTRACT

An animal trap which is made of a guillotine type to allow the construction of traps relatively larger than those with jaws and which kill the animal instantaneously. This animal trap of the guillotine type comprises a frame including a pair of spaced-apart posts forming a gate for an animal, a transverse guillotine member slidable along these posts, a triggering loop pivotally suspended in registry with the gate, latching fingers cooperatively and releasably holding the transverse guillotine member in elevated open position, springs biasing the transverse guillotine member toward a fallen closed position and a ratchet locking device releasably locking the transverse guillotine member in fallen closed position.

4 Claims, 7 Drawing Figures

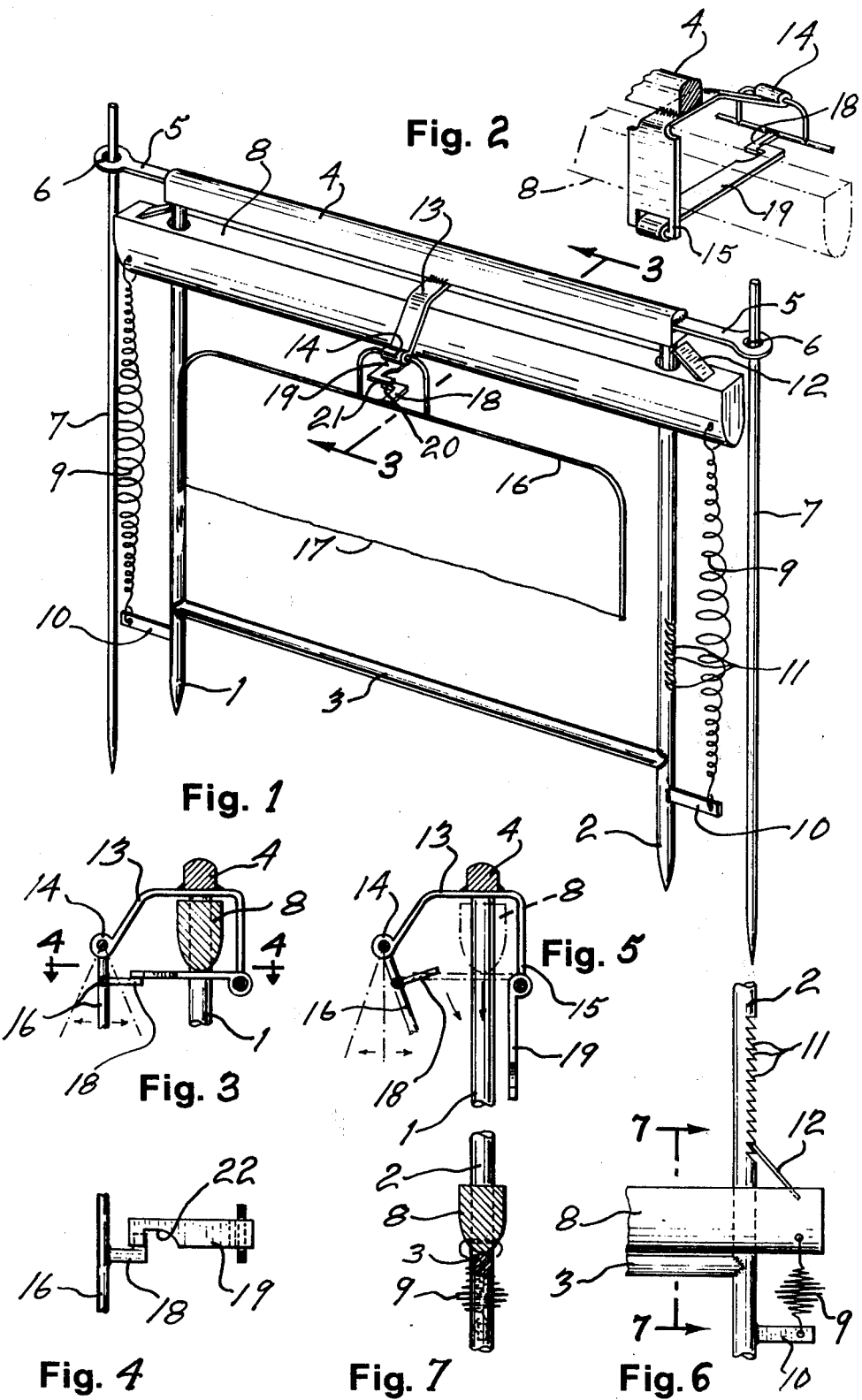

GUILLOTINE TYPE ANIMAL TRAP

This invention relates to an animal trap of the guillotine type.

The conventional animal traps are made with pivoted jaws actuated by very stiff helical springs. These traps are limited in size by these springs which cannot produce the desired bias in practical conditions.

It is a general object of the present invention to provide an animal trap which can be made of relatively larger size than the known traps using pivoted jaws.

It is a more specific object of the present invention to provide an animal trap of the guillotine type and thereby provide a trap of relatively larger size than heretofore obtainable.

It is another object of the present invention to provide an animal trap of the above type, which can kill the animal instantenously, as it catches the latter between two rigid bars behind the shoulders.

It is another specific object of the present invention to provide an animal trap of the above type, which takes advantage of the weight of the guillotine member to minimize the size of the springs required to produce effective closing of the trap.

The above and other objects and advantages of the present invention will be better understood with the following detailed description of a preferred embodiment thereof which is illustrated, by way of example, in the accompanying drawings, wherein:

FIG. 1 is a perspective view of an animal trap of the guillotine type according to the present invention;

FIG. 2 is a perspective view of the latch forming part of the trap of FIG. 1;

FIG. 3 is a cross-sectional view as seen along line 3—3 in FIG. 1, illustrating the latch in untriggered position;

FIG. 4 is a cross-sectional view as seen along line 4—4 in FIG. 3;

FIG. 5 is a view similar to FIG. 3 but with the latch in released position;

FIG. 6 is a partial view of the animal trap particularly illustrating a ratchet locking forming part of the latter; and FIG. 7 is a cross-sectional view as seen along line 7—7 in FIG. 6.

The illustrated animal trap includes a frame formed of a pair of posts 1 and 2 rigidly secured in laterally spaced-apart relationship by a transverse bottom member 3 and a transverse top member 4. The posts 1 and 2 are laterally spaced apart to form a gate for an animal between them and are adapted to be driven into the ground to remain operatively upright. The transverse top member 4 is provided with projections 5 at the opposite ends thereof, each having a downwardly directed opening 6 therein. These openings 6 are provided to fix the frame even better by a pair of sticks or posts 7 passing through them and driven into the ground.

Although the frame is shown of rigid construction, it might advantageously be made of disconnectable parts, such as to collapse into a compact package for transportation. This, of course, would be particularly advantageous for traps of largest sizes.

A transverse guillotine bar, or member 8, is apertured at opposite ends and slidably engaged with the spaced-apart posts 1 and 2 in the apertures thereof. Thus, the guillotine bar 3 is slidably displaceable up and down along the posts 1 and 2 between an elevated open position near the top member 4 of the frame and a fallen closed position adjacent the transverse bottom bar or member 3, as shown in FIGS. 1 and 6 respectively. It must be noted that the bottom bar 3 cooperates with the guillotine bar 8 to trap an animal at the neck.

A pair of springs 9 are connected at one end of the opposite ends respectively of the guillotine bar 8 and at the other end to a pair of lugs 10 fixed to the posts 1 and 2 respectively.

The post 2 is formed with a row of ratchet teeth 11 adapted to be releasably engaged by a flexible pawl 12 fixed on top of the corresponding end of the transverse guillotine member 8. As illustrated in FIG. 6, when the guillotine member 8 has fallen as far as it can go, the pawl 12 engages one of the ratchet teeth 11 and locks the guillotine member to hold the trapped animal. The pawl 12 may be disengaged to lift the guillotine member to the elevated open position.

A bracket 13 is secured to the top bar 4 and has opposite ends 14 and 15 projecting on opposite sides respectively of the top bar. The end 14 forms a pivot for a trigger device which is suspended thereto for pivotal movement about an axis extending substantially parallel to the guillotine member 8. The trigger device includes a loop registering with the afore-mentioned gate and formed of a rigid U-shaped member 16 and a transverse cord 17 attached at its opposite ends to the free ends of the U-shaped member 16. The cord 17, or the like, is at a predetermined height to intercept an animal in the gate at the level of the chest and extends substantially fully from one to the other of the posts 1 and 2.

A pair of latching fingers 18 and 19 are provided to releasably hold the guillotine bar 8 in the elevated open position. The finger 18 is rigidly secured to the U-shaped trigger member 16 and projects therefrom toward the other side of the guillotine bar 8. The finger 19 is pivoted to the end 15 of the bracket 13 about a second axis substantially parallel to the pivot axis of the trigger device. The fingers 18 and 19 are provided with lateral projections 20 and 21 respectively arranged to be superposed when the finger 19 latchingly passes under the guillotine bar 8 and supports the latter in the elevated open position, as best shown in FIGS. 2, 3, and 4. It must be noted that the finger 19 is notched at 22, thus allowing the lateral projection 21 to drop either forward or rearward of the projection 20.

It will be readily understood that the trapping of an animal is initiated by engagement or bumping of the animal against the cord or wire 17. This causes the projection 20 to slide either forward or rearward relative to the other lateral projection 21. The finger 19 is thus freed, allowing the guillotine bar 8 to drop under its own weight assisted by the springs 9. The animal is thus caught behind the shoulders, as cord 17 extends slightly, and the animal is retained between the transverse bottom bar 3 and the guillotine member 8 with the locking action of the pawl 12 with one ratchet tooth 11. Experiments have proven that the animal is killed instantaneously.

The cord or string 17 is preferably camouflaged by appropriate choice of color, such as yellow. The frame, and as much as possible the whole trap, is camouflaged but such as to leave access to the afore-mentioned gate.

For example, a trap for hares would have a gate of about 15 inches by 15 inches, while a trap for lynx would have a gate of about 30 inches high and 15 inches wide.

I claim:

1. An animal trap comprising a frame including a pair of posts arranged in laterally spaced-apart relationship to form a gate for an animal, a transverse guillotine member slidable along said posts for movement between an elevated open position and a fallen closed position, a pair of springs connected to the opposite ends of said transverse guillotine member on opposite sides of said gate and biasing said transverse guillotine member towards the fallen closed position thereof, a latch secured to the frame and arranged to hold the transverse guillotine member in the elevated open position against the bias of the springs, and a trigger device for unlatching said latch, said trigger device comprising a loop pivotally suspended from said frame about an axis extending longitudinally of said transverse guillotine member on one side thereof and having an animal intercepting bottom edge section substantially stretching from one to the other of said posts, said latch including a pair of interengaging fingers, one of said fingers being pivoted to said frame about another axis extending parallel to said first-named axis and on the opposite side of said transverse guillotine member relative to said first-named axis, said one finger adapted to extend across the underside of said transverse guillotine member in the holding position thereof and the other of said fingers being rigidly secured to said loop at a distance spaced from the pivotal axis of said loop and engaging under said first-named finger to releasably support the latter in said holding position, said fingers forming a pair of superposed lateral projections disengageable from each other upon pivoting of said loop in either angular direction about said first-named axis, said trap further including a ratchet locking device interconnecting said guillotine member to said frame and adapted to releasably lock said guillotine member in the closed position thereof.

2. An animal trap as defined in claim 1, wherein said ratchet locking device includes ratchet teeth formed along one of said posts and a pawl secured to said transverse guillotine member and releasably locking with one of said teeth upon falling of said transverse guillotine member.

3. An animal trap as defined in claim 2, wherein said frame includes a bottom transverse member underlying said transverse guillotine member and adapted to trap an animal by falling of the transverse guillotine member toward said bottom transverse member, said frame includes a transverse top member carrying said one finger and having downwardly apertured projections at opposite ends thereof for fixing anchoring posts in said apertured projections.

4. An animal trap comprising a frame including a pair of posts arranged in laterally spaced-apart relationship to form a gate for an animal, transverse top and bottom members rigidly secured to said post at their ends, a transverse guillotine member slidable along said posts for movement between an elevated open position adjacent said top transverse member and a fallen closed position adjacent said bottom transverse member, spring means attached to said frame and to said transverse guillotine member and biasing the latter to its fallen closed position, ratchet teeth formed along at least one of said posts and pawl carried by said transverse guillotine member and releasably locking with one of said teeth upon falling of said transverse guillotine member, a latch secured to the frame and arranged to hold the guillotine member in the elevated open position against the bias of the spring means and a trigger device operatively engaging said latch and releasably holding the latter in latching position.

* * * * *